UNITED STATES PATENT OFFICE.

AUSTIN G. DAY, OF NEW YORK, N. Y.

PROCESS OF MANUFACTURING CRUDE KERITE COMPOUNDS.

SPECIFICATION forming part of Letters Patent No. 322,804, dated July 21, 1885.

Application filed June 29, 1885. (No specimens.)

*To all whom it may concern:*

Be it known that I, AUSTIN G. DAY, of the city of New York, in the State and county of New York, have invented a new and useful Improvement in Processes of Manufacturing Crude Kerite Compounds; and I hereby declare that the following is a full, clear, concise, and exact description of the same.

This invention consists in the combination of certain vegetable astringents with the cotton-seed oil and linseed-oil or their equivalents and the other ingredients which compose the kerite; and the object of it is to impart to the latter an improved fibrous character, thereby increasing its toughness and elasticity and enabling a larger proportion of it to be employed whenever it is desired to be mixed with india-rubber, and also better adapting it for use in some cases as a substitute for rubber.

The chief part of my new process is the same as that set forth in Letters Patent of the United States No. 210,411, granted to me on the 3d of December, 1878, for "an improvement in the manufacture of artificial caoutchouc or kerite," and a portion of the description of the treatment therein directed to be followed will suffice for this specification.

The essential ingredients in carrying out my present process are, in addition to the vegetable astringents, cotton-seed oil and linseed-oil or equivalent vegetable oils, together with coal-tar or bitumen and sulphur in its ordinary form, or in place of the latter I may, in accordance with Letters Patent No. 322,803, granted to me of even date herewith, employ the sulphide of antimony or other suitable sulphide, or both sulphur in its ordinary form and a sulphide combined; and the substance of the method by which I unite the said ingredients with each other to make the kerite product is to first mix together and heat the cotton-seed oil and coal-tar or bitumen or equivalent, and after they have properly combined to add the linseed-oil to the heated mixture and then introduce the astringent, and afterward put in the sulphur or sulphide or both combined and increase the temperature of the whole to such extent and for such length of time as will produce vulcanization of the mass.

In putting my process into practice I first mix the cotton-seed oil and coal-tar or bitumen together in a suitable kettle or boiler under a suitable heat and for a sufficient length of time to cause them to unite together freely and thoroughly. The temperature ordinarily required for this purpose will be about 300° to 330° Fahrenheit, and the time generally from three to five hours. The mixture is then cooled down to, say, from 200° to 220°, or sometimes to only 240° Fahrenheit, or thereabout, and then the linseed-oil may be added. To obtain the best result, however, I let the cotton-seed oil and coal-tar or bitumen stand over night to cool. If this course be adopted, they will be found in the morning to be thoroughly combined, and I then heat them up to the above-specified temperature of from 200° to 220° or sometimes 240° Fahrenheit, and add the requisite quantity of linseed-oil. When the linseed-oil has become thoroughly incorporated with the other ingredients, which usually takes from one to two hours, and preferably a little while before or at about the time when I am ready to add the sulphur or sulphide, which I generally commence to do when the mixture is at a temperature of, say, 230° Fahrenheit, I introduce a small quantity of some suitable vegetable astringent—such as tannin or tannic acid, extract of gambia, extract of hemlock-bark, extract of pine, spruce, or oak bark, extract of nut-galls, sumac, or the like—and then put in the sulphur or sulphide, adding the latter gradually, and as it combines with the other ingredients I usually raise the temperature to about 275° to 300° Fahrenheit, or in that vicinity, the degree of temperature depending largely upon the length of heating time employed. The heating of the compound may be continued until vulcanization of the mass takes place—say, in the case of a usual working batch of about one hundred pounds, for from five to ten hours, or sometimes longer. When the vulcanization is complete, the compound is finished, and it may then be poured into molds or pans of any desired dimensions and allowed to cool for use or for the market.

I sometimes add the astringents after the sulphur or sulphide, and this may always be done, if desired.

The proportions of all these ingredients may be greatly varied; but I recommend as adapted to produce a compound suitable for most ordinary purposes twenty-seven pounds of cotton-seed oil mixed with, say, twenty pounds of coal-tar, or fifteen to twenty-five pounds of bitumen, to which may be added twenty-seven pounds of linseed-oil, one-half pound tannin or tannic acid, and from twelve to sixteen pounds, or thereabout, of sulphur, or if a sulphide is employed—say, the sulphide of antimony or sulphide of zinc—from six to eight pounds, or thereabout, of sulphur in the ordinary form, and about the same quantity of the sulphide.

The proportions which I prefer of the vegetable astringents other than tannic acid which are named above are as follows: extract hemlock-bark, about one-half pound; extract pine-bark, about one-half pound; extract spruce-bark, about one-half pound; extract oak-bark, about one-half pound; extract nut-galls, about one-half pound; extract gambia, six to eight ounces; extract sumac, one pound; extract tamarack, about one pound.

I do not confine myself to the astringents named in this specification, as there are others which may be used. Tannic acid is the active principle of all or most of the vegetable astringents, and any of them which contain a sufficient amount of it will answer a good purpose.

The effect of these new ingredients is to give the product a better fibrous character than I have ever before obtained, and it will be obvious that the greater the extent to which the crude kerite can be caused to possess this property the greater will be its value for all purposes in the arts. Especially for such uses as mixing it with india-rubber in order to cheapen the cost of the raw material, or in some cases substituting it for india-rubber, the increased cohesiveness and the superior elasticity which the astringents impart to it will be found of much importance. The astringents also improve the capacity of the crude kerite to combine with india-rubber, and render the product more solid and durable.

In practice, whenever desired, gum-camphor, as well as sulphuric, nitric, or muriatic acid, or oxide of iron, may be added to my present compound in the same manner as described in my 1878 patent; but the proportions in which they are used should preferably be considerably larger than there specified.

In addition to employing vegetable astringents with the oils, in combination with coal-tar or bitumen and with or without sulphur, I believe I am the first to combine them with vegetable oils without the other ingredients, as a step in the manufacture of rubber substitutes and analogous compounds. For such purposes my experience has shown me that so used alone they have a decided value.

Having thus made known my invention, what I claim, and desire to secure by Letters Patent, is—

1. The herein-described process of manufacturing crude kerite compounds, consisting of combining one or more vegetable astringents with vegetable oils, coal-tar or bitumen, and sulphur or a sulphide, or both the latter together, substantially in the manner set forth.

2. The combination of one or more vegetable astringents with vegetable oils, and subjecting them, without the admixture of coal-tar or bitumen, and either with or without sulphur or a sulphide, or both the latter together, to the treatment herein described, for the purpose specified.

AUSTIN G. DAY.

Witnesses:
EDWARD B. McCLEES,
J. K. HAYES.